(12) United States Patent
Gunyan et al.

(10) Patent No.: US 7,423,470 B2
(45) Date of Patent: Sep. 9, 2008

(54) PULSE GENERATOR

(75) Inventors: Daniel B. Gunyan, Rohnert Park, CA (US); Jonathan B. Scott, Santa Rosa, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 77 days.

(21) Appl. No.: 11/444,991

(22) Filed: May 31, 2006

(65) Prior Publication Data

US 2007/0279116 A1   Dec. 6, 2007

(51) Int. Cl.
*G06F 1/04* (2006.01)
(52) U.S. Cl. ...................................... 327/291; 327/293
(58) Field of Classification Search ........................ None
See application file for complete search history.

(56) References Cited

U.S. PATENT DOCUMENTS

| | | | |
|---|---|---|---|
| 4,583,008 A | | 4/1986 | Grugett |
| 5,255,130 A | * | 10/1993 | Buchan et al. ................. 360/41 |
| 5,594,690 A | * | 1/1997 | Rothenberger et al. . 365/189.01 |
| 5,844,438 A | * | 12/1998 | Lee ............................ 327/291 |
| 5,929,684 A | * | 7/1999 | Daniel ......................... 327/299 |
| 6,087,870 A | * | 7/2000 | Sakamoto .................... 327/176 |
| 6,320,437 B1 | * | 11/2001 | Ma ............................. 327/175 |

\* cited by examiner

*Primary Examiner*—Cassandra Cox

(57) ABSTRACT

A split signal pulse generator ("SSPG") that generates a difference signal from two split signals from a splitter module, where one of the split signals may be time delayed by a delay module, where the delay module may be a transmission line having a time delay or an adjustable delay line. The SSPG may include an input amplifier configured to shape an input signal received by the splitter module. A method of generating a difference signal is also provided.

20 Claims, 10 Drawing Sheets

PULSE GENERATOR

BACKGROUND OF THE INVENTION

Signal generation instruments perform many functions necessary to the testing, operation and maintenance of modern electronic applications. These signal generation instruments include pulse generators, pattern generators, data generators, pseudo-random bit sequence ("PRBS") generators, controllable jitter injection, and timing generators. The digital waveforms and data signals generated by these instruments, such as generating digital pulses, high-speed clock signals, square waves, and flexible serial or parallel bit patterns and data streams, may be utilized in many applications requiring pulse and data generation. Applications include frequency upconversion, time-domain reflectometry, emissions testing, and phase coherency, among many other applications.

A typical pulse train generated by these signal generation instruments has some important features: (a) a frequency-domain spectrum with comb spacing equal to the inverse of the pulse-repetition frequency ("PRF") rate; (b) a frequency-domain amplitude shape defined by the sinc function (with a max-to-null bandwidth equal to the inverse of the pulse width); and (c) a constant phase difference between adjacent combs.

However, other useful reference signals are also possible. For example, the pulse train may be modulated to spread the energy such that the peak amplitude is lower in the time domain while maintaining the same comb amplitude in the frequency domain. The pulse train may also be filtered so that only a portion of the frequency spectrum is utilized.

FIGS. 1A and 1B show the time and frequency-domain descriptions 100, 120, respectively, of an ideal pulse train. In FIG. 1A, the time-domain description 100 of an ideal pulse train 102 is shown. The separation of the rising edges, $\Delta t$ 104, generally known as the pulse period, is equal to the reciprocal of the PRF, $f_{rep}$ 122, where $\Delta t = 1/f_{rep}$.

In FIG. 1B, the corresponding frequency-domain description 120 of the ideal pulse train is shown. That is, the periodic pulse train is Fourier-transformed. The amplitude spectrum of the pulse train consists of many equidistant spectral points 122, which are denoted by the circles in FIG. 1B, where the amplitude values are represented by the amplitude axis 130. The unwrapped phase spectrum of the pulse train consists of many equidistant spectral points 123, which are denoted by the triangles in FIG. 1B, where the phase values are represented by the phase axis 132. The spacing 124 of the spectral points 122 and 123 is equal to the repetition rate $f_{rep}$ of the periodic pulse train. The width of the amplitude spectrum 128 until the first null, $f_o$ 126, is determined by the pulse width, $t_p$ 106, where $f_o = 1/t_p$. The spectral width 128, therefore, increases with decreasing pulse width. The unwrapped phase spectrum 123 is constant up to the frequency of the first null 126 in the amplitude spectrum 122.

Known methods of pulse generation include the use of step-recovery diodes ("SRDs") and non-linear transmission lines ("NLTLs"). SRDs are used for pulse generation because when switched from forward bias to reverse bias, SRDs have fast recovery time, and as a result, are capable of producing pulses with sharp and fast rise times. NLTLs are also used for pulse shaping, i.e., pulse narrowing and edge sharpening. Unfortunately, both of these methods typically have poor phase responses, have varying output level with input drive level, have high PRFs or a narrow range of PRFs, and are not easily manufactured utilizing standard surface-mount technology (which results in higher manufacturing costs).

Another type of pulse generator that uses logic gates and logic delay elements is disclosed in U.S. Pat. No. 4,583,008 titled "Retriggerable Edge Detector for Edge-Actuated Internally Clocked Parts" to Grugett. This type of pulse generator is typically used to create clock signals in digital circuits. Unfortunately, as pulse widths of logic circuits decrease to tens of picoseconds, digital circuit processes require reduced voltage swings. The reduced voltage swing also reduces the available signal-to-noise ratio of the ouput pulse. Another disadvantage of the logic pulse generator is that the input signal must be a square wave or pulse train. These signals, however, are difficult to generate using microwave frequency signal generators.

Therefore, there is a need for an improved pulse generator that has lower manufacturing costs, better phase response and output characteristics, higher signal-to-noise ratio, and that allows for PRF rates that are lower or higher than conventional pulse generators. This improved pulse generator should also be usable with input signals from conventional microwave frequency signal generators.

SUMMARY

A split signal pulse generator ("SSPG") that includes a signal splitter, signal lines of unequal time delay, and a difference amplifier is disclosed. The SSPG may also include a DC offset in signal communication with an input of the difference amplifier that suppresses a portion of the out-going signals from the difference amplifier. The difference amplifier may be a limiting difference amplifier that limits the amplitude of the out-going signals. Additionally, the SSPG may include an input amplifier or a divider in signal communication with the SSPG. These two optional additions may improve phase noise or jitter with certain input signals and also shape certain input signals to allow a larger range of input signals to be used, such as those created by conventional microwave sources.

In an example of operation of the SSPG, an input signal is input to the signal splitter, which generates two output split signals. One of the split signals is time-delayed, creating an amplitude difference between the split signals at the input of the difference amplifier. The amplitude difference is amplified by the difference amplifier, which outputs one or more output signals which may be limited in amplitude. One of the outputs may be a pulse train. Additionally, the SSPG may include a DC offset that is applied between the inputs to the difference amplifier. The application of the DC offset will suppress the opposite-outgoing pulse in the output pulse train, resulting in unidirectional outgoing pulses.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of the preferred embodiment, reference is made to the accompanying drawings that form a part hereof, and which show, by way of illustration, a specific embodiment in which the invention may be practiced. Other embodiments may be utilized and structural changes may be made without departing from the scope of this invention.

In general, the invention is a split signal pulse generator ("SSPG") that allows pulse-repetition frequency ("PRF") rates that are below (or above) conventional pulse generators. In an example of operation, the SSPG may operate at PRF rates that may be varied from as low as one millihertz to as high as multiple gigahertz clock rates.

Figure 1A:
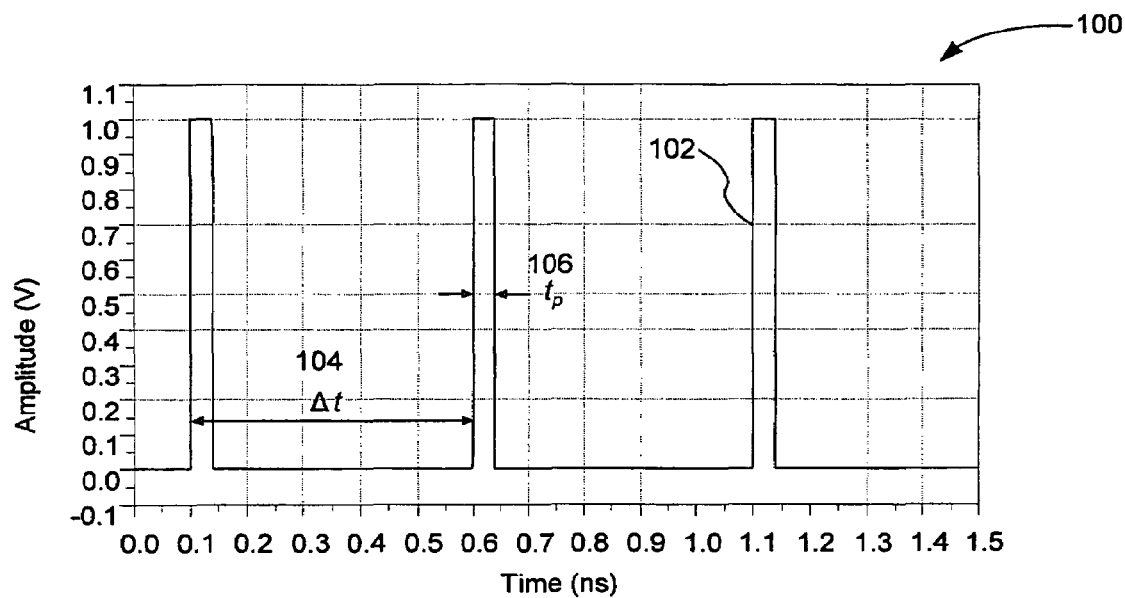
FIG. 1A shows a graphical representation of an example plot of a time-domain description of an ideal pulse train.
Figure 1B:
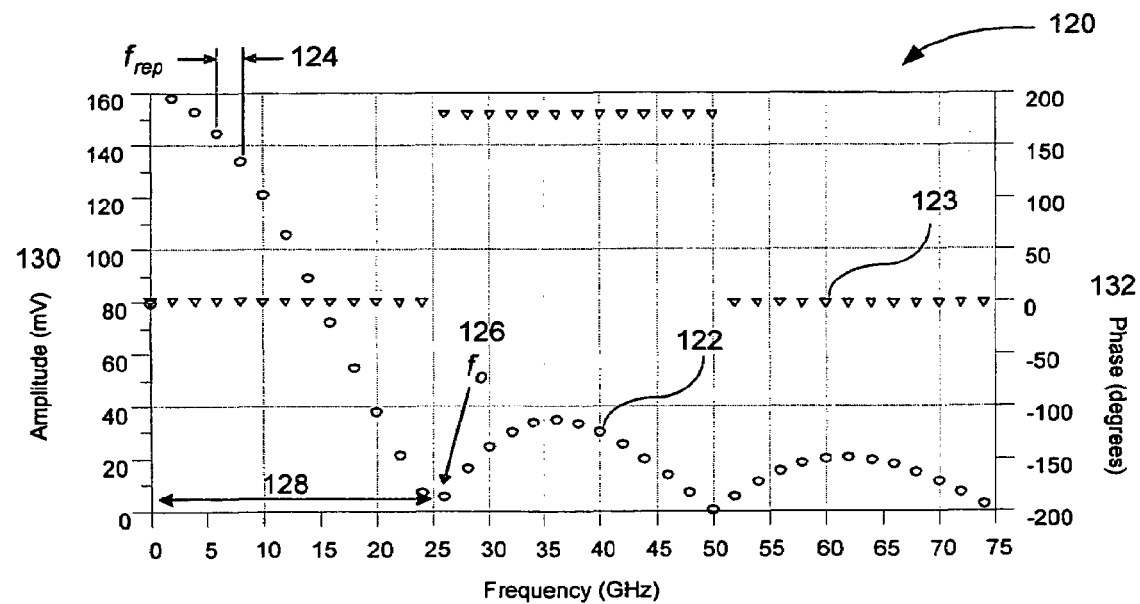
FIG. 1B shows a graphical representation of an example plot of a frequency-domain description of an ideal pulse train.
Figure 2:
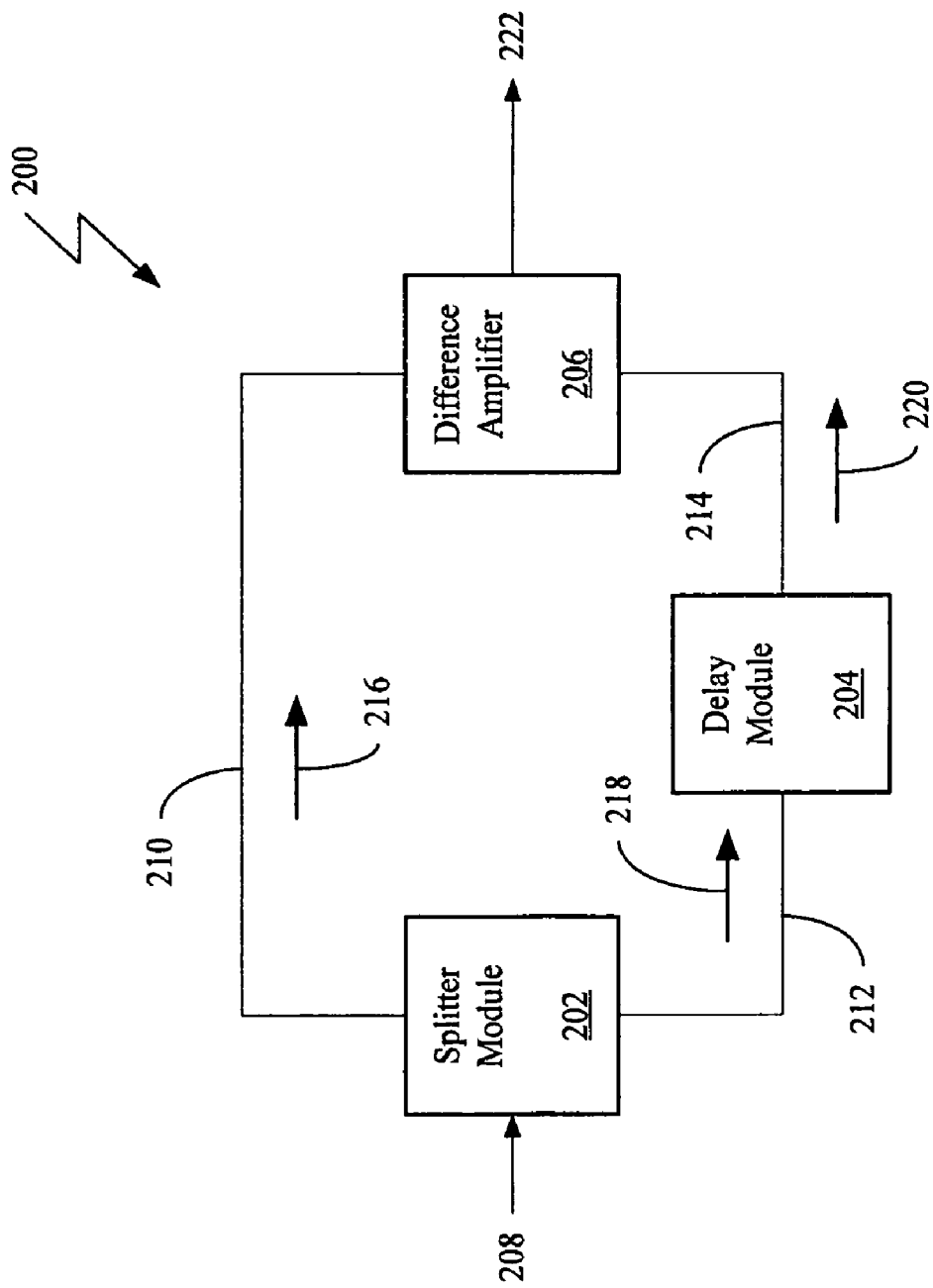
FIG. 2 shows a block diagram of an example of an implementation of a split signal pulse generator ("SSPG").

In FIG. 2, a block diagram of an example of an implementation of the SSPG 200 is shown. The SSPG 200 may include a splitter module 202, delay module 204, and difference amplifier 206. In this implementation example, the splitter module 202 is in signal communication with both the difference amplifier 206 and delay module 204 via signal paths 210 and 212, respectively. The difference amplifier 206 is also in signal communication with the delay module 204 via signal path 214.

In an example of operation, the SSPG 200 receives an input signal 208 at the splitter module 202 and in response, the splitter module 202 splits the input signal 208 to produce two split signals (first split signal 216 and second split signal 218) that are passed to difference amplifier 206 and delay module 204 via signal paths 210 and 212, respectively. In response to receiving the second split signal 218, the delay module 204 delays the second split signal 218 to produce a delayed split signal 220 that is passed to the difference amplifier 206 via signal path 214. The difference amplifier 206 receives the first split signal 216 and the delayed split signal 220 and in response produces an output 222 that is a function of the voltage difference between the first split signal 216 and the delayed split signal 220. The output 222 may be proportional to the input and may be limited in amplitude.

Figure 3:
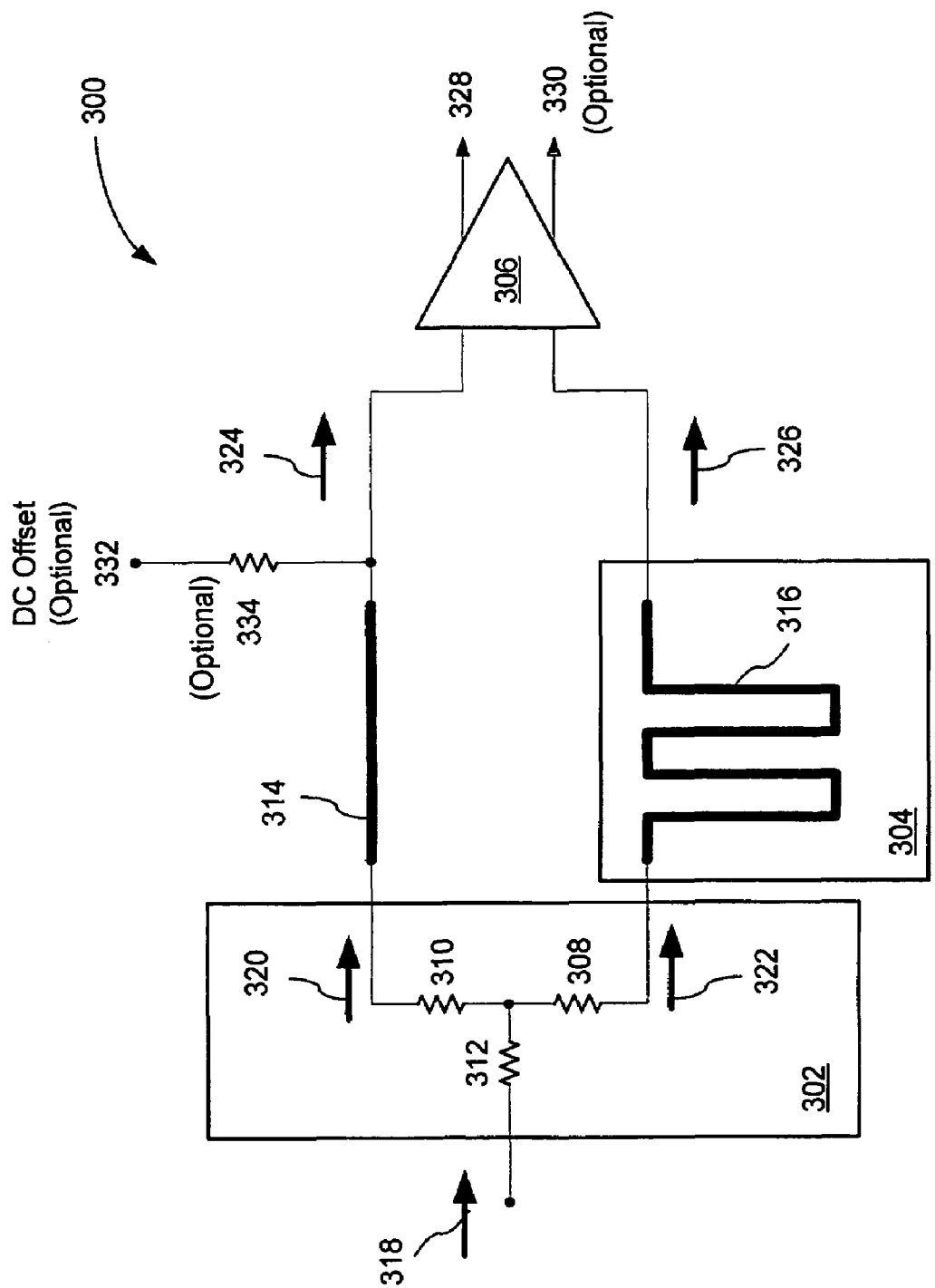
FIG. 3 shows a schematic diagram of an example of an implementation of the SSPG shown in FIG. 2.

In FIG. 3, a schematic diagram of an example of an implementation of the SSPG 300 is shown. Similar to FIG. 2, the SSPG 300 may include a splitter module 302, delay module 304, and difference amplifier 306. The splitter module 302 may include a splitter circuit that includes, for example, resistors 308, 310, and 312. The splitter module 302 may be in signal communication with the difference amplifier 306 via two transmission lines 314 and 316. It is appreciated by those skilled in the art that the splitter module 302 and the delay module 304 may be passive or active and may include various types of circuitry.

In an example of operation, the SSPG 300 receives the input signal 318 at the splitter module 302 and in response the splitter module 302 splits the input signal 318 to produce two split signals (first split signal 320 and second split signal 322) that are passed to difference amplifier 306 via transmission lines 314 and 316, respectively. It is appreciated that each transmission line 314 and 316 introduces a time delay in each split signal that is proportional to the length of the respective transmission line. As an example, the first transmission line 314 produces a first time delay on first split signal 320 to produce a first delayed split signal 324 and the second transmission line 316 produces a second time delay on the second split signal 322, to produce a second delayed split signal 326 (i.e., such as the delayed split signal 220 in FIG. 2). The first time delay is proportional to the length of the first transmission line 314 and the second time delay is proportional to the length of the second transmission line 316.

If the first transmission line 314 and the second transmission line 316 are of different lengths, the length difference creates a time delay between the first delayed split signal 324 and second delayed split signal 326 that is proportional to the difference in length between the first transmission line 314 and second transmission line 316. It is appreciated by those skilled in the art that the difference in length may be mechanically or electrically tuned by physically stretching a transmission line or by modifying the effective capacitance and inductance of a transmission line. Examples of other means of adjusting lengths of transmission lines include variable or switched delay lines, variable capacitors, and tuning stubs.

The difference amplifier 306 receives the resulting first delayed signal 324 and second delayed signal 326 and in response, produces two differential outputs 328 and 330 that are proportional to the voltage difference between the first delayed split signal 324 and second delayed split signal 326 and that may also be limited in amplitude. The first difference output 328 may be a positive difference output and the second difference output 330 may be a negative difference output. It is appreciated, in this example, that the second difference output 330 is optional and may be utilized as an opposite-going pulse train.

Figure 4A:
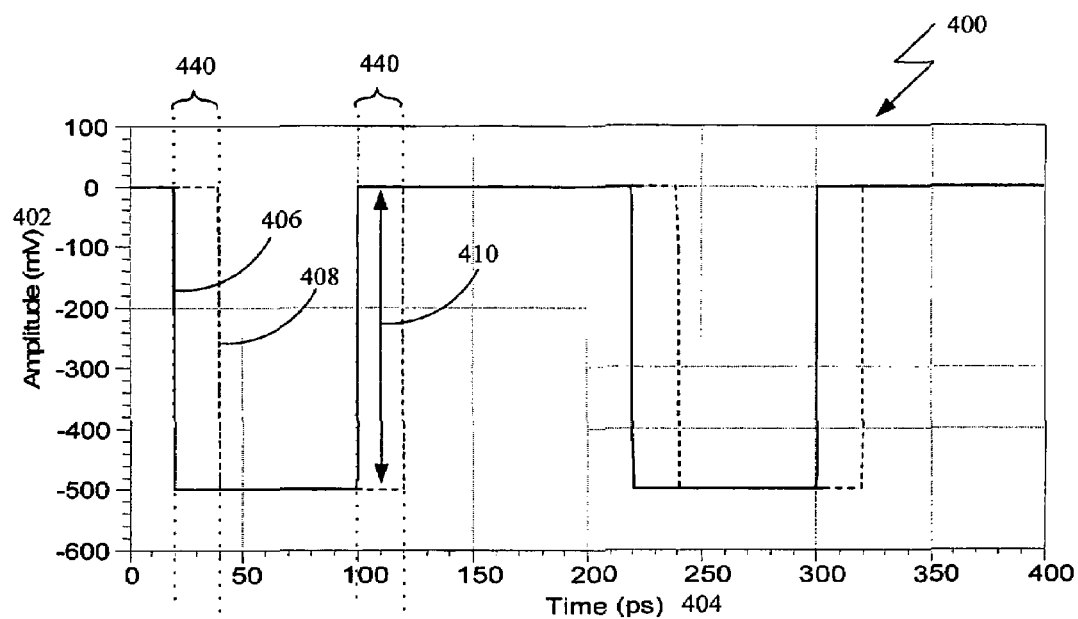
FIG. 4A shows a graphical representation of an example of a plot of voltage versus time of the signals going into the difference amplifier shown in FIG. 3.

As an example, when input signal 318 is a square wave signal, the difference amplifier 306 produces a positive pulsed output signal at the first difference output 328 and may produce a negative pulsed output signal at the second difference output 330 upon receiving the split signals 324 and 326. FIG. 4A shows a graphical representation of an example of a plot 400 of voltage 402 (in millivolts) versus time 404 (in picoseconds) of the input split signals 324 and 326. As an example, the first delayed split signal 324 may be shown in plot 400 as first signal plot 406 and the second delayed split signal 326 may be shown as second signal plot 408.

Also shown in FIG. 4A is the time delay 440 (in picoseconds) between the first delayed split signal 324 and second delayed split signal 326. During the duration of time delay 440, there exists a difference in amplitude voltage 410 (in millivolts) between the first delayed split signal 324 and the second delayed split signal 326 as shown by the first signal plot 406 and the second signal plot 408, respectively.

Figure 4B:
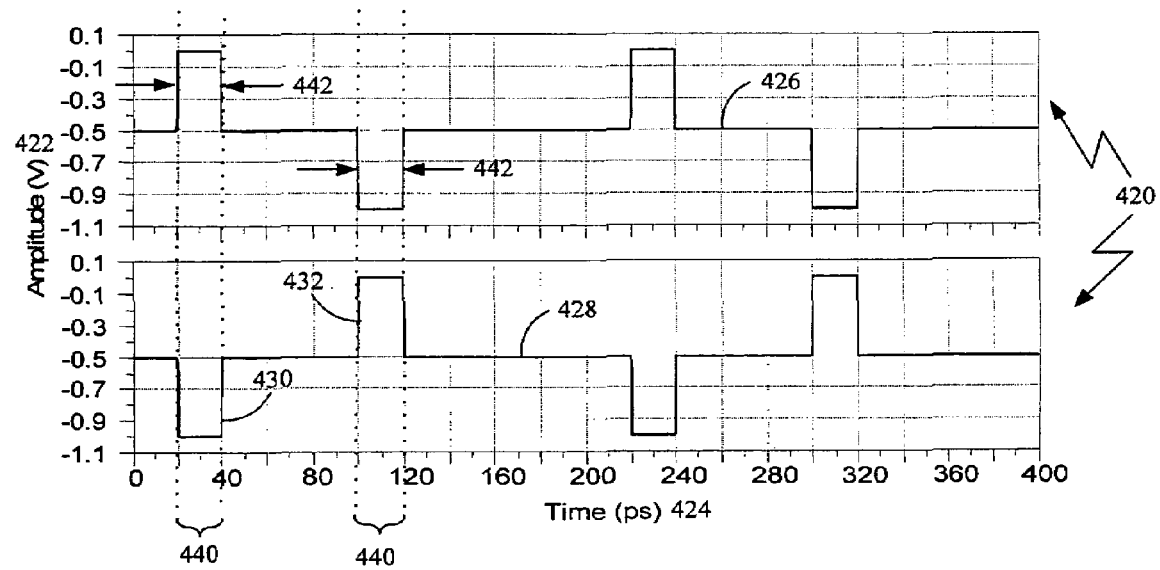
FIG. 4B shows a graphical representation of an example of a plot of voltage versus time of the output signals from the difference amplifier shown in FIG. 3.

FIG. 4B shows a graphical representation of an example of a plot 420 of voltage 422 versus time 424 of the output signals 426 and 428 (corresponding to first differential outputs 328 and 330) from the difference amplifier 306 shown in FIG. 3. The output signals 426 and 428 are the result of amplifying the amplitude difference 410, which results in the output signals 426 and 428 having pulse widths 442 that correspond to the time delay difference 440.

In this example, generally, a pulse 430 and an opposite-going pulse 432 will be generated as the first delayed split signal 324 and second delayed split signal 326 transition low and then high, respectively. The opposite-going pulse 432 may be suppressed by applying an optional DC offset 332 (through, for example, optional impedance 334) between the inputs of the difference amplifier 306 or by other means appreciated by those skilled in the art, such as, for example, a potentiometer connected to a voltage reference, a digitally-controlled voltage reference, or a current source connected to impedance 334.

Figure 5A:
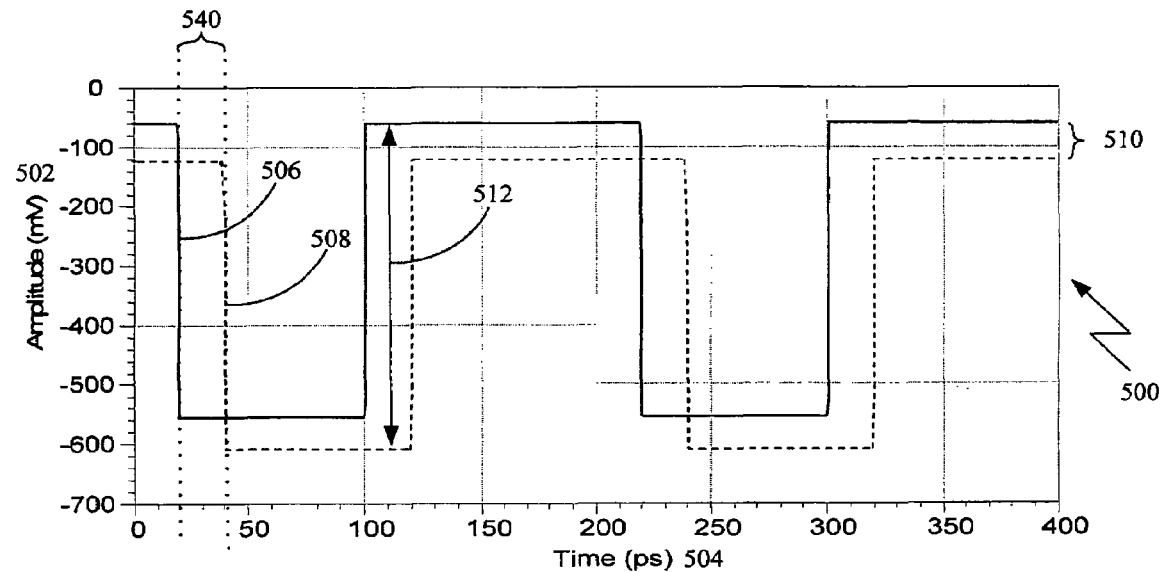
FIG. 5A shows a graphical representation of an example of a plot of voltage versus time of the signals going into the difference amplifier shown in FIG. 3 with DC offset applied.

FIG. 5A shows a graphical representation of a plot 500 of voltage 502 (in millivolts) versus time 504 (in picoseconds) of the input split signals 324 and 326 when the DC offset 332 is applied. The DC offset creates a voltage difference between the split signals 324 and 326. An example of this voltage difference 510 is plotted along with the input signals 506 and 508.

Figure 5B:
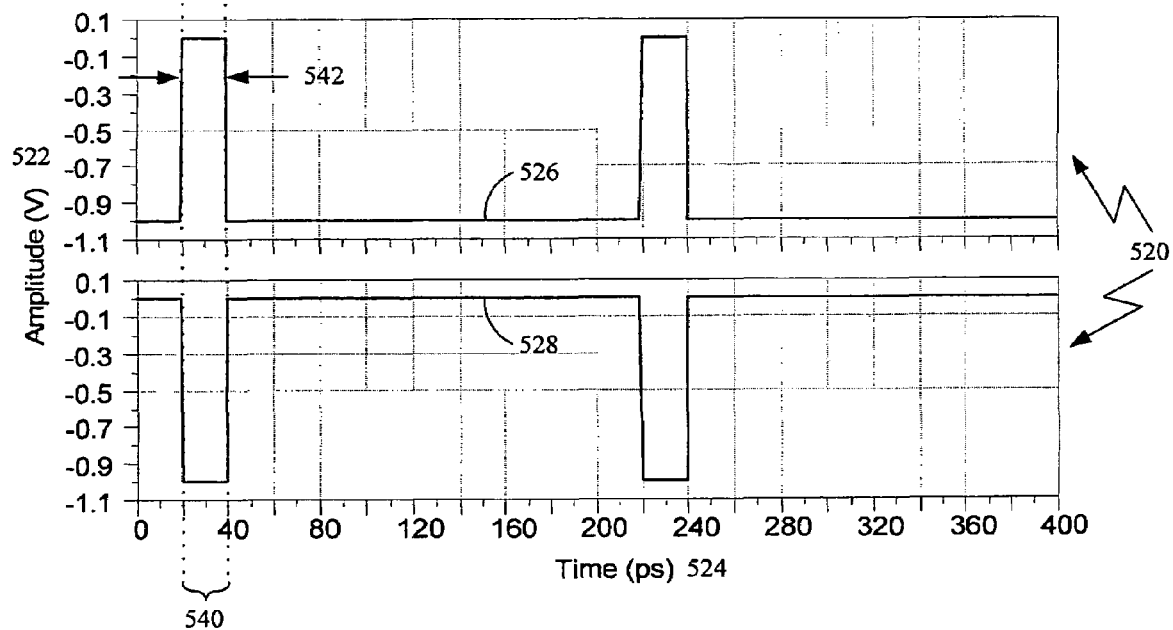
FIG. 5B shows a graphical representation of an example of a plot of voltage versus time of the output signals from the difference amplifier shown in FIG. 3 with DC offset applied.

When this voltage difference 510 and the voltage difference 512 caused by the time delay is amplified by the difference amplifier 306 and the amplifier is limited in amplitude, the opposite-going pulses 432 and 442, FIG. 4B, will be suppressed, and the resulting pulses will always go in the same direction. FIG. 5B shows a graphical representation of an example of a plot 520 of voltage 522 versus time 524 of the output signals 526 and 528 with opposite-going pulses suppressed. As in the previous example, the width 542 of the pulses corresponds to the time delay difference 540 between the input signals to the difference amplifier 306. The width 542 also depends on the value of applied DC offset 332, FIG. 3, which provides a means of adjusting the width of the pulses when the input signals are not ideal square waves.

Figure 6:
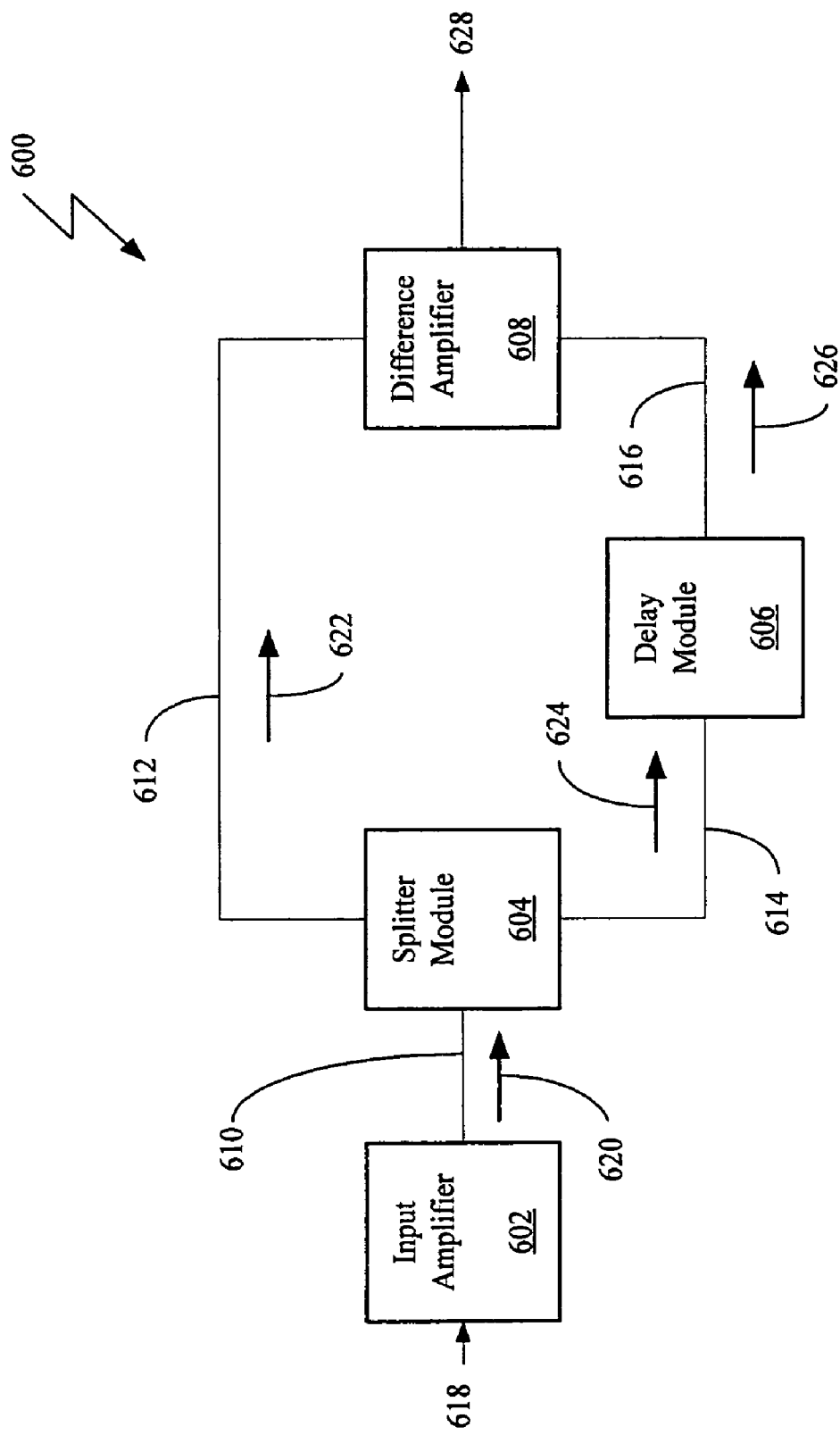
FIG. 6 shows a block diagram of an example of another implementation of the SSPG that includes an input amplifier.

In FIG. 6, a block diagram of an example of another implementation of the SSPG 600 that includes an input amplifier 602 is shown. The input amplifier 602 may be a shaping amplifier that converts an arbitrary input signal 618 to an output signal 620 that more closely approximates a square wave. An example of the class of shaping amplifiers includes a limiting amplifier. Without an input shaping amplifier of sufficient gain, the characteristics of the output pulse train could vary with input drive level for input signals that do not approximate square waves. The addition of the input amplifier 602 allows the use of standard microwave sources, which generally only produce sinusoidal signals.

The SSPG 600 may include the input amplifier 602 and a splitter module 604, delay module 606, and difference amplifier 608. In this implementation example, the input amplifier 602 is in signal communication with the splitter module 604 via signal path 610. The splitter module 604 is in signal communication with the both the difference amplifier 608 and delay module 606 via signal paths 612 and 614, respectively. The difference amplifier 608 is also in signal communication with the delay module 606 via signal path 616.

In an example of operation, the SSPG 600 receives an input signal 618 at the input amplifier 602, which shapes the input signal 618 and passes the shaped input signal 620 to the splitter module 604. The splitter module 604 receives the shaped input signal 620 and in response splits the shaped input signal 620 to produce two split signals (first split signal 622 and second split signal 624) that are passed to difference amplifier 608 and delay module 606 via signal paths 612 and 614, respectively. In response to receiving the second split signal 624, the delay module 606 delays the second split signal 624 to produce a delayed split signal 626 that is passed to the difference amplifier 608 via signal path 616. The difference amplifier 608 receives the first split signal 622 and the delayed split signal 626 and in response produces an output signal 628 that is proportional to the voltage difference between the first split signal 622 and delayed split signal 626.

Similar to the example described in FIG. 3, an opposite-going pulse may also be generated as the first delayed split signal 622 and second delayed split signal 626 transition in the opposite direction. This opposite-going pulse may be suppressed by applying an optional DC offset (not shown) between the inputs of the difference amplifier 608 or by other means.

Figure 7:
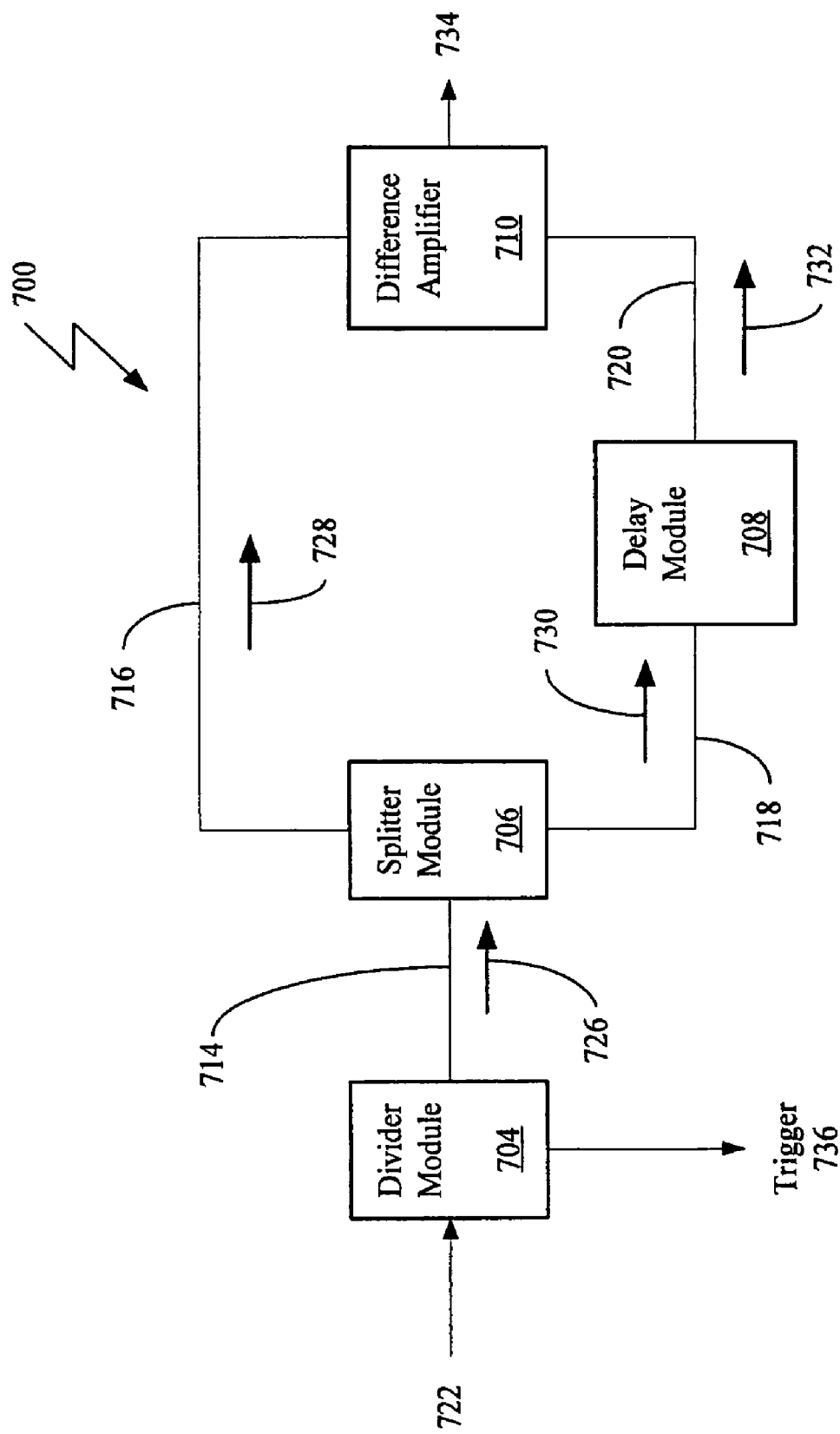
FIG. 7 shows a block diagram of an example of yet another implementation of the SSPG shown in FIG. 6 that includes a divider.

In FIG. 7, a block diagram of an example of yet another implementation of the SSPG 700 that includes a divider module 704 is shown. The divider module 704 reduces phase noise and jitter for the SSPG 700 and also shapes the input signal to more closely resemble a square wave. The SSPG 700 may also include a splitter module 706, delay module 708, and difference amplifier 710. In this implementation example, the divider module 704 is in signal communication with splitter module 706 via signal path 714. The splitter module 706 is in signal communication with the both the difference amplifier 710 and delay module 708 via signal paths 716 and 718, respectively. The difference amplifier 710 is also in signal communication with the delay module 708 via signal path 720.

In an example of operation, the SSPG 700 receives an input signal 722 at the divider module 704, which produces a divided and shaped input signal 726. The divider module 704 passes the divided input signal 726 to the splitter module 706. The divider module 704 may be a device capable of lowering the repetition frequency of the input signal 722 by an integer value (i.e., a divide by 2, divide by 4, divide by 8, etc.) in such a manner as to reduce the phase noise and jitter of the amplified input signal 722 and produce a square wave output. Examples of devices that may be utilized as the divider module 704 include sequential logic circuits such as a static frequency divider, ripple counter or other similar type devices. The divider module 704 may include a trigger signal 736 that may be used as a reference to the decreased output repetition frequency of the divided input signal 726.

The splitter module 706 receives the divided input signal 726 and in response splits the divided input signal 726 to produce two split signals (first split signal 728 and second split signal 730) that are passed to the difference amplifier 710 and delay module 708 via signal paths 716 and 718, respectively. In response to receiving the second split signal 730, the delay module 708 delays the second split signal 730 to produce a delayed split signal 732 that is passed to the difference amplifier 710 via signal path 720. The difference amplifier 710 receives the first split signal 728 and the delayed split signal 732 and, in response, produces an output 734 that is proportional to the voltage difference between the first split signal 728 and delayed split signal 732.

Again, similar to the example described in FIG. 3, an opposite-going pulse may also be generated as the first delayed split signal 728 and second delayed split signal 732 transition in the opposite direction. This opposite-going pulse may be suppressed by applying an optional DC offset (not shown) between the inputs of the difference amplifier 710.

The divider module 704 may be replaced by a multiplier module (not shown) that increases the repetition frequency of input signal 724 by an integer value and also produces a square wave output. This may result in more energy per output tone (in the frequency domain) in output signal 734 and may also allow lower frequency input signals 722 to be used.

Figure 8:
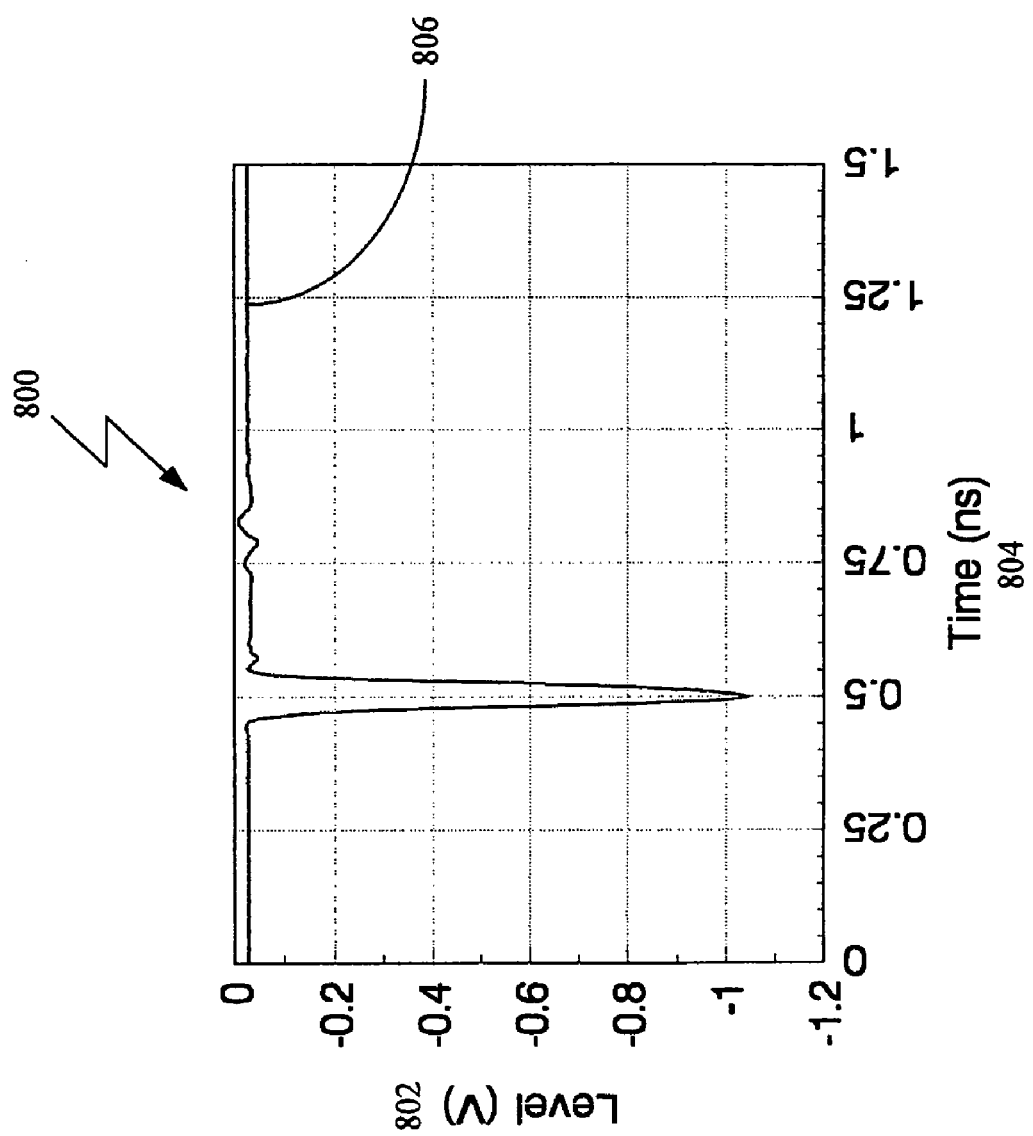
FIG. 8 shows a graphical representation of an example of a plot of a measurement of a negative pulse output of a SSPG.

As an example of operation, in FIG. 8, a graphical representation of an example of a plot 800 of voltage 802 (in volts) versus time 804 (in nanoseconds) of a measurement of a negative pulse output 806 of the SSPG 200, FIG. 2, with a pulse width of about 35 picoseconds and the opposite-going pulse suppressed, is shown.

Figure 9:
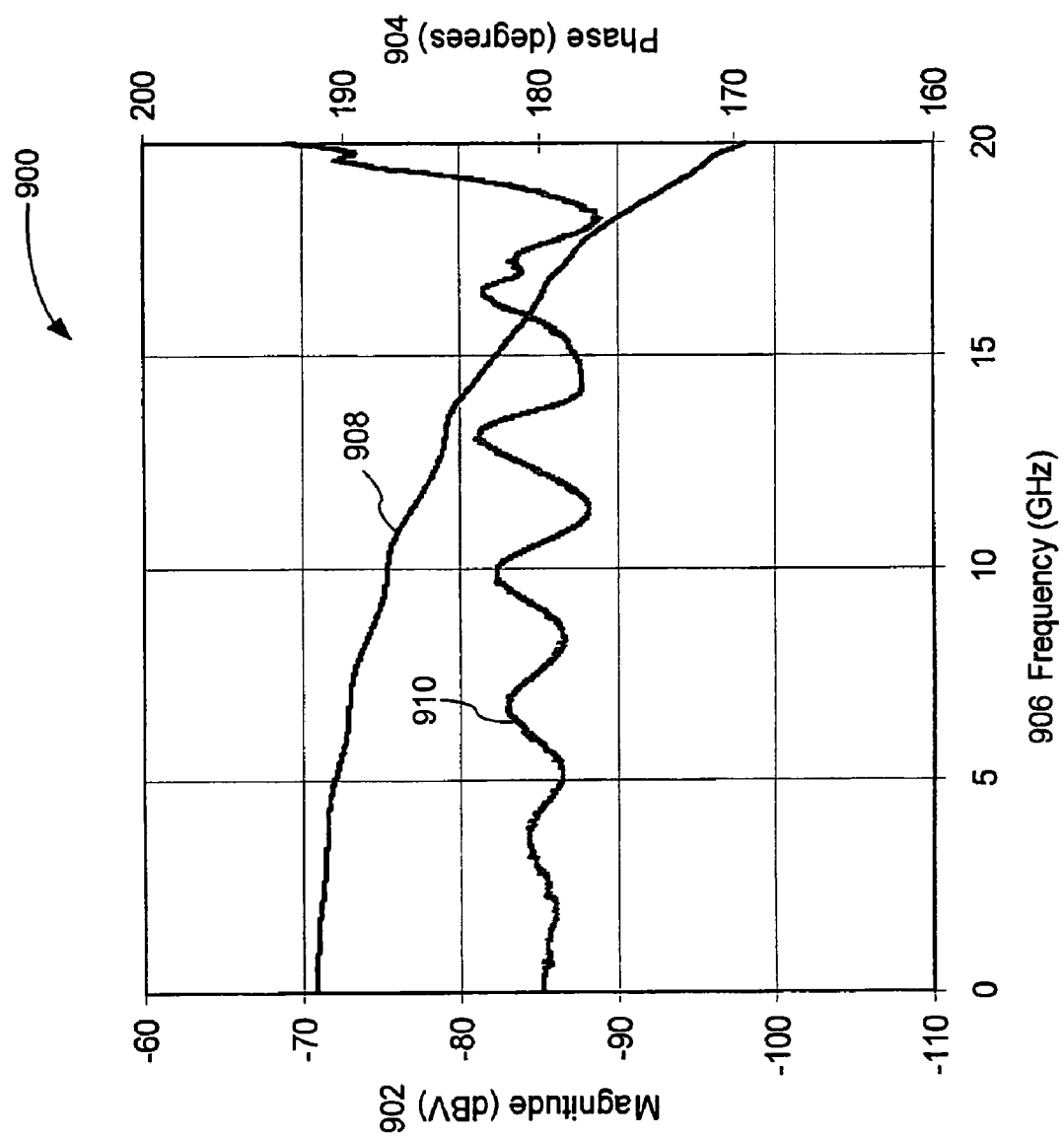
FIG. 9 shows a graphical representation of an example of a plot of the amplitude and phase spectrum of the pulse shown in FIG. 8.

Additionally, FIG. 9 shows a graphical representation of an example of a plot 900 of the amplitude 902 (in dBV) versus frequency 906 (in gigahertz) of a measurement of the amplitude spectrum 908 for the pulse 806 shown in FIG. 8 with a repetition frequency of 10 MHz, and the phase 904 (in degrees) versus frequency 906 (in gigahertz) of a measurement of the phase spectrum 910 for the pulse 806 shown in FIG. 8 with a repetition frequency of 10 MHz.

Figure 10:
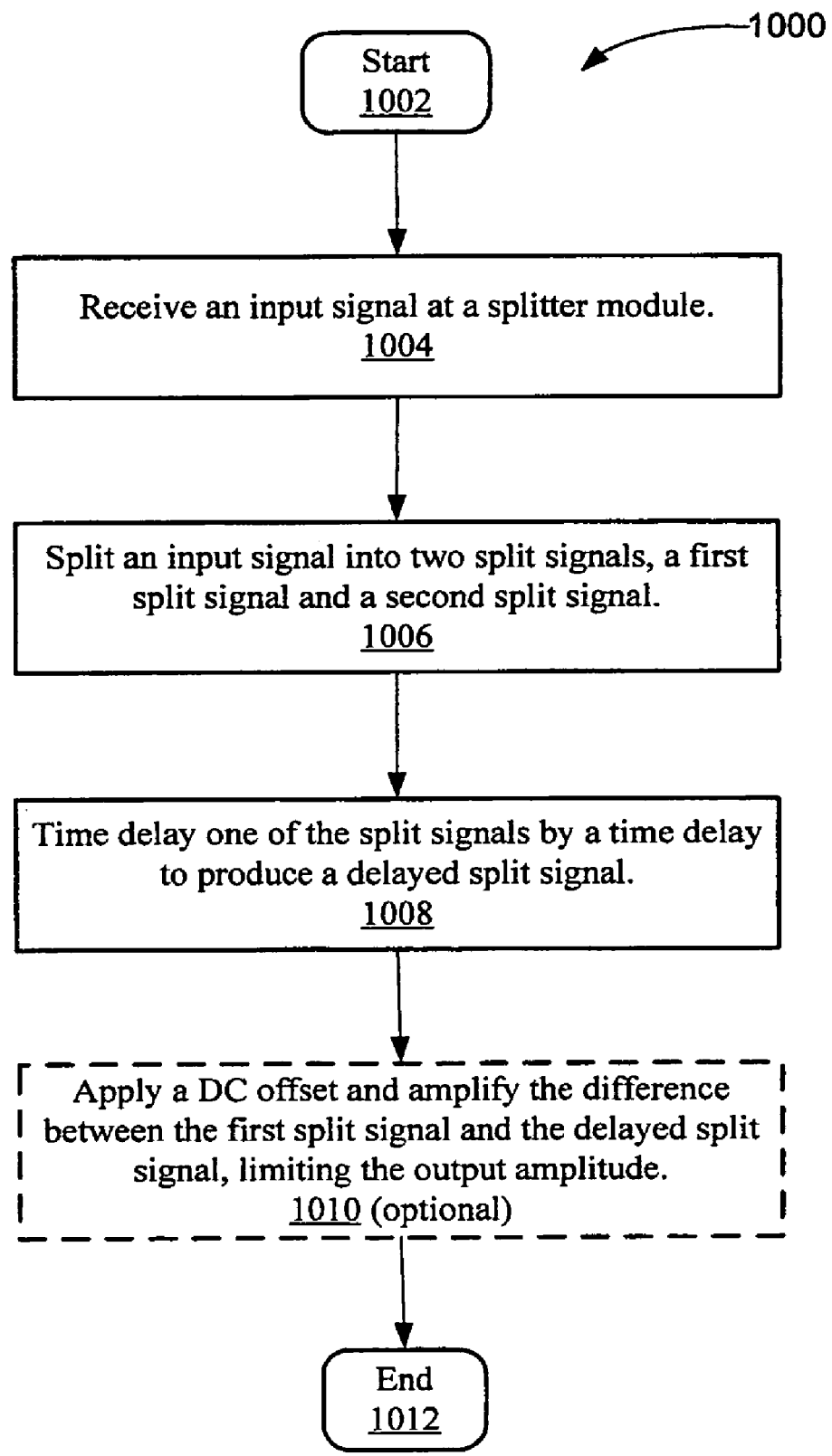
FIG. 10 shows a flow diagram of the steps performed in an example of a process of operation of the SSPG shown in FIGS. 2 and 3.

FIG. 10 shows a flow diagram 1000 of the steps performed in an example of a process of operation of the SSPG 200 shown in FIG. 2. The process begins in step 1002, and in step 1004, a splitter module of SSPG 200, FIG. 2, receives an input signal. In step 1006, the splitter module splits the signal into two split signals, a first split signal and a second split signal. The second split signal is then time delayed, in step 1008, to produce a delayed split signal that is input to the difference amplifier with the first split signal. In optional step 1010, an optional DC offset is applied between the inputs of the difference amplifier, which amplifier amplifies the difference between the first split signal and the delayed split signal and limits the output amplitude, producing an output that is a pulse train with each pulse going in the same direction. The process then ends in step 1012.

While the foregoing description refers to the use of an SSPG, the subject matter is not limited to such a system. Any signal generation instruments or systems that could benefit from the functionality provided by the components described above may be implemented in the SSPG.

Moreover, it will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention.

What is claimed:

1. A split signal pulse generator ("SSPG") in signal communication with a signal source whereby a pulse train output signal may be generated, the SSPG comprising:
   a splitter module configured to receive an input signal from the signal source and generate a first split signal and a second split signal from the input signal;
   a delay module in signal communication with the splitter module, wherein the delay module is configured to produce a delayed split signal from the second split signal; and
   a difference amplifier in signal communication with the signal splitter and delay module, wherein the difference amplifier is configured to generate a difference signal from the first split signal and the delayed split signal.

2. The SSPG of claim 1, wherein the delay module is a transmission line having a time delay, wherein the time delay is applied to the second split signal.

3. The SSPG of claim 1, wherein the delay module is an adjustable delay line having an adjustable time delay whereby the pulse width of a pulse train output signal may be adjusted, wherein the adjustable time delay is applied to the second split signal.

4. The SSPG of claim 1, wherein the difference amplifier is a limiting difference amplifier, further including a DC offset in signal communication with at least one input to the difference amplifier,
   whereby a unidirectional pulse train output signal may be generated.

5. The SSPG of claim 4, wherein the delay module is a transmission line having a time delay, wherein the time delay is applied to the second split signal.

6. The SSPG of claim 4, wherein the delay module is an adjustable delay line having an adjustable time delay whereby the pulse width of the pulse train output signal may be adjusted, wherein the adjustable time delay is applied to the second split signal.

7. The SSPG of claim 4, further including an input amplifier in signal communication with the splitter module and the input signal, wherein the input amplifier is configured to shape the input signal into a square wave or pulse train.

8. The SSPG of claim 7, wherein the input amplifier is selected from a group consisting of limiting amplifiers, limiting static frequency dividers, and limiting frequency multipliers.

9. The SSPG of claim 8, wherein the delay module is a transmission line having a time delay, wherein the time delay is applied to the second split signal.

10. The SSPG of claim 8, wherein the delay module is an adjustable delay line having an adjustable time delay whereby the pulse width of the pulse train output signal may be adjusted, wherein the adjustable time delay is applied to the second split signal.

11. A method of generating pulse signals from a split signal pulse generator ("SSPG"), the method comprising:
    receiving an input signal;
    splitting the input signal into a first split input signal and a second split input signal;
    time delaying the second split input signal to produce a delayed split signal; and
    generating a difference signal from the first split signal and the delayed split signal,
    wherein the difference signal is proportional to a voltage difference between the first split signal and the second split signal.

12. The method of claim 11, further including the step of applying a DC offset between the first split signal and the delayed split signal.

13. The method of claim 12, further including the step of limiting the difference signal in amplitude.

14. The method of claim 11, further including the step of shaping the input signal before splitting the input'signal to produce a shaped input signal that approximates a square wave.

15. The method of claim 14, further including the step of varying the pulse width of the difference signal by adjusting the time delay between the first split signal and the delayed split signal.

16. The method of claim 14, further including the step of varying the pulse width of the difference signal by adjusting the DC offset between the first split signal and the delayed split signal.

17. A split signal pulse generator ("SSPG") in signal communication with a signal source, the SSPG comprising:
   a means for receiving an input signal;
   a means for splitting the input signal into a first split input signal and a second split input signal;
   a means for time delaying the second split input signal to produce a delayed split signal; and
   a means for generating a difference signal from the first split signal and the delayed split signal, wherein the difference signal is proportional to a voltage difference between the first split input signal and the second split input signal.

18. The SSPG of claim 17, further including:
   a means of applying a DC offset between the first split signal and the delayed split signal; and
   a means of limiting the difference signal in amplitude.

19. The SSPG of claim 18, further including a means for shaping the input signal into a square wave or pulse train in signal communication with the splitter module and the input signal.

20. The SSPG of claim 19, wherein the shaping means is a device selected from the group consisting of limiting amplifiers, limiting static frequency dividers, and limiting frequency multipliers.

* * * * *